(12) United States Patent
Matsumoto et al.

(10) Patent No.: US 11,110,386 B2
(45) Date of Patent: Sep. 7, 2021

(54) AIR PURIFICATION DEVICE FOR VEHICLE

(71) Applicant: HONDA MOTOR CO., LTD., Tokyo (JP)

(72) Inventors: Subaru Matsumoto, Wako (JP); Shinji Kakizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 519 days.

(21) Appl. No.: 16/183,246

(22) Filed: Nov. 7, 2018

(65) Prior Publication Data
US 2019/0160418 A1 May 30, 2019

(30) Foreign Application Priority Data

Nov. 30, 2017 (JP) .............................. JP2017-230700

(51) Int. Cl.
*B01D 53/02* (2006.01)
*B01D 53/04* (2006.01)
(Continued)

(52) U.S. Cl.
CPC ..... *B01D 53/0462* (2013.01); *B01D 53/0438* (2013.01); *B01D 53/0446* (2013.01);
(Continued)

(58) Field of Classification Search
CPC ........ B01D 2253/108; B01D 2257/504; B01D 2257/80; B01D 2259/40009;
(Continued)

(56) References Cited

U.S. PATENT DOCUMENTS 3,242,651 A * 3/1966 Arnoldi .................. B01D 53/04 96/127
4,530,817 A * 7/1985 Holter .................. B60H 3/0633 422/122

(Continued)

FOREIGN PATENT DOCUMENTS

JP H09175164 A 7/1997
JP H106765 A 1/1998
(Continued)

OTHER PUBLICATIONS

Notice of Reasons for Refusal for JP Application No. 2017230700, dated Jul. 16, 2019, 4 pages.
(Continued)

Primary Examiner — Christopher P Jones
(74) Attorney, Agent, or Firm — Armstrong Teasdale LLP (57) ABSTRACT

An air purification device for a vehicle includes: a sorption device provided with a sorbent; an air intake duct for sucking air in a vehicle cabin; an outlet-side three-way valve connected to the sorption device; an air supply duct for blowing air into the cabin; an exhaust duct for discharging air to outside of the cabin; a blower; a heater; and a controller. The controller selectively executes a purification mode in which air in the cabin is sent into the sorption device at a purification temperature, and purified air from which moisture and carbon dioxide have been removed by the sorbent is blown into the cabin, and a first regeneration mode in which air heated to a first regeneration temperature is sent into the sorption device, and exhaust air containing moisture and carbon dioxide released from the sorbent is discharged to the outside of the cabin.

11 Claims, 7 Drawing Sheets

(51) Int. Cl.

| | | |
|---|---|---|
| *B60H 3/00* | (2006.01) | |
| *B60H 1/00* | (2006.01) | |
| *B60H 3/02* | (2006.01) | |
| *B60H 3/06* | (2006.01) | |
| *B01D 53/26* | (2006.01) | |
| *B01D 53/30* | (2006.01) | |

(52) U.S. Cl.
CPC ....... *B01D 53/0454* (2013.01); *B01D 53/261* (2013.01); *B60H 1/008* (2013.01); *B60H 1/00785* (2013.01); *B60H 3/0085* (2013.01); *B60H 3/024* (2013.01); *B60H 3/0633* (2013.01); *B01D 53/30* (2013.01); *B01D 2253/108* (2013.01); *B01D 2257/504* (2013.01); *B01D 2257/80* (2013.01); *B01D 2259/40009* (2013.01); *B01D 2259/4566* (2013.01); *B60H 2003/026* (2013.01); *B60H 2003/028* (2013.01); *B60H 2003/0691* (2013.01)

(58) Field of Classification Search
CPC ........ B01D 2259/4566; B01D 53/0438; B01D 53/0446; B01D 53/0454; B01D 53/0462; B01D 53/261; B01D 53/30; B60H 1/00785; B60H 1/008; B60H 2003/026; B60H 2003/028; B60H 2003/0691; B60H 3/0085; B60H 3/024; B60H 3/0633

See application file for complete search history.

(56) References Cited

U.S. PATENT DOCUMENTS

| | | | |
|---|---|---|---|
| 5,873,256 A * | 2/1999 | Denniston | F24F 3/1423 62/91 |
| 10,898,850 B2 * | 1/2021 | Matsumoto | B60H 3/0633 |
| 2009/0277195 A1 * | 11/2009 | Viegas | B60H 3/024 62/115 |
| 2009/0318068 A1 | 12/2009 | Iida et al. | |
| 2012/0241127 A1 | 9/2012 | Watanabe | |
| 2013/0192281 A1 * | 8/2013 | Nam | B60H 1/3201 62/101 |
| 2014/0134056 A1 * | 5/2014 | Shinoda | B01D 53/66 422/122 |
| 2015/0298043 A1 * | 10/2015 | Meirav | B01D 53/04 95/11 |
| 2017/0087963 A1 | 3/2017 | Tajima et al. | |
| 2018/0244129 A1 * | 8/2018 | Whitens | B60H 1/00878 |
| 2019/0030997 A1 * | 1/2019 | Maeda | B60H 3/024 |

FOREIGN PATENT DOCUMENTS

| | | |
|---|---|---|
| JP | 2009090906 A | 4/2009 |
| JP | 2014058262 A | 4/2014 |
| JP | 2016030565 A | 3/2016 |
| JP | 2016064695 A | 4/2016 |
| JP | 2017206145 A | 11/2017 |
| WO | 2009063848 A1 | 5/2009 |
| WO | 2011071192 A1 | 6/2011 |
| WO | 2015182402 A1 | 12/2015 |
| WO | 2017162807 A1 | 9/2017 |

OTHER PUBLICATIONS

Notice of Reasons for Refusal for JP Application No. 2017230700, dated Jan. 28, 2020, 10 pages.

* cited by examiner

AIR PURIFICATION DEVICE FOR VEHICLE

TECHNICAL FIELD

The present disclosure relates to an air purification device for a vehicle provided with a sorbent (adsorbent and/or absorbent) capable of sorbing moisture and carbon dioxide in the air and releasing the sorbed moisture and carbon dioxide.

BACKGROUND ART

When the temperature in a room is being controlled by an air conditioner, it is preferred to recirculate air in the room instead of ventilating with outside air in order to reduce power consumption. However, in the closed space, a carbon dioxide concentration tends to increase due to respiration of people in the room. It is known that the increase in the carbon dioxide concentration can be a cause of a person's concentration drop and/or drowsiness, and thus is unfavorable.

WO2015/182402A1 discloses, as a carbon dioxide concentration control device for controlling a carbon dioxide concentration contained in air in a closed space (such as a vehicle cabin) to an appropriate value, a portable-type carbon dioxide concentration control device, including: an absorbent capable of controlling an absorbing rate of carbon dioxide; a detecting unit that detects the carbon dioxide concentration in the space; a control unit that controls absorbing rate of the absorbent; a regeneration unit that regenerates the absorbent by causing the absorbent to release the absorbed carbon dioxide. This carbon dioxide concentration control device further includes a first power supply unit that supplies power for driving the detecting unit and the control unit from a first power source (such as a cigar socket); and a second power supply unit that supplies power for driving the regeneration unit from a second power source (such as household power) which is different from the first power source. In this carbon dioxide concentration control device, the absorbent absorbing carbon dioxide in the vehicle cabin can be regenerated on a regular basis by taking the carbon dioxide concentration control device to the outside of the vehicle cabin, whereby the carbon dioxide concentration control device can be used for a long period of time.

However, in the carbon dioxide concentration control device disclosed in WO2015/182402A1, if the absorbent is saturated as a result of absorbing a large amount of carbon dioxide, the absorbent cannot be regenerated while the vehicle is traveling, and therefore, it is not possible to suppress an increase in the carbon dioxide concentration thereafter. In addition, even when the absorbent is not saturated, if the air conditioner is in an inside air recirculation mode for recirculating the air in the vehicle cabin without admitting outside air in the vehicle cabin, not only the carbon dioxide concentration but also the humidity increases due to respiration of the vehicle occupants, and this may cause fogging of the window glass of the vehicle.

SUMMARY OF THE INVENTION

In view of such background, a primary object of the present invention is to provide an air purification device for a vehicle that can suppress an increase in the carbon dioxide concentration continuously during travel of the vehicle and can suppress fogging of the window glass of the vehicle.

To achieve the above object, one embodiment of the present invention provides air purification device (10, 40) for a vehicle (1), comprising: a sorption device (12) provided with a sorbent (11) that sorbs moisture and carbon dioxide in air at a purification temperature (normal temperature (e.g., 0 to 30 degrees Celsius)) and releases the sorbed moisture and carbon dioxide at a first regeneration temperature (e.g., 60 degrees Celsius) higher than the purification temperature; an air intake duct (14) having one end formed with at least a suction opening (16a) for sucking air in a vehicle cabin (3) and another end connected to an inlet (12a) of the sorption device; a three-way valve (22) having an input port (22a) connected to an outlet (12b) of the sorption device; an air supply duct (23) having one end connected to a first output port (22b) of the three-way valve and another end formed with a blowing opening (23a) for blowing air into the vehicle cabin; an exhaust duct (24) having one end connected to a second output port (22c) of the three-way valve and another end formed with an exhaust opening (24a) for discharging air to outside of the vehicle cabin; a blower (19) for sending air from the air intake duct into the sorption device; a heater (20) for selectively heating air sent into the sorption device; and a controller (35) configured to control the three-way valve, the blower, and the heater to thereby selectively execute a purification mode (ST3) in which air in the vehicle cabin is sent into the sorption device at the purification temperature, and purified air from which moisture and carbon dioxide have been removed by the sorbent is blown into the vehicle cabin, and a first regeneration mode (ST10) in which air heated to the first regeneration temperature is sent into the sorption device and exhaust air containing moisture and carbon dioxide released from the sorbent is discharged to the outside of the vehicle cabin.

According to this arrangement, when the controller executes the purification mode, moisture and carbon dioxide in the air in the vehicle cabin are sorbed (namely, adsorbed and/or absorbed) by the sorbent, and therefore, an increase in the carbon dioxide concentration and humidity in the vehicle cabin can be suppressed. This also suppresses fogging of the window glass of the vehicle. Further, when the controller executes the first regeneration mode, exhaust air containing moisture and carbon dioxide released from the sorbent is discharged to the outside of the vehicle cabin, and the sorbent is regenerated, and therefore, it is possible to suppress an increase in the carbon dioxide concentration and humidity continuously during travel of the vehicle.

In the above arrangement, preferably, the sorbent (11) releases one of the sorbed moisture and carbon dioxide at a second regeneration temperature (e.g., 40 degrees Celsius) higher than the purification temperature and lower than the first regeneration temperature, wherein the air purification device further comprises: an in-cabin CO2 concentration sensor (31) that detects a carbon dioxide concentration in the vehicle cabin; and an in-cabin absolute humidity estimator (35a) that estimates an absolute humidity in the vehicle cabin, and wherein the controller (35) is configured to control the three-way valve, the blower, and the heater based on outputs of the in-cabin CO2 concentration sensor and the in-cabin absolute humidity estimator to thereby selectively execute the purification mode, the first regeneration mode, and a second regeneration mode (ST14) in which air heated to the second regeneration temperature is sent into the sorption device, and exhaust air containing the one of the moisture and carbon dioxide released from the sorbent is discharged to the outside of the vehicle cabin.

Here the expression "releases one of the sorbed moisture and carbon dioxide" does not necessarily mean that the other is not released, but means that only one of the sorbed moisture and carbon dioxide is released at a rate equal to or higher than a predetermined rate appropriate for regeneration. Namely, the other of the sorbed moisture and carbon dioxide may be released at a rate lower than a predetermined rate appropriate for regeneration. Also, the expression "containing the one of the moisture and carbon dioxide" means containing at least the one of the moisture and carbon dioxide that is released at a rate equal to or higher than the predetermined rate appropriate, and does not necessarily mean that the other is not contained.

According to the above arrangement, because the controller selectively executes the purification mode, the first regeneration mode, and the second regeneration mode based on the outputs of the in-cabin $CO_2$ concentration sensor and the in-cabin absolute humidity estimator, it is possible to prevent the sorbent from becoming saturated or being left saturated with moisture and/or carbon dioxide. Further, because in the second regeneration mode the controller controls the heater to heat the air to the second regeneration temperature lower than the first regeneration temperature, the energy required for heating can be reduced.

In the above arrangement, preferably, the controller (35) is configured to estimate a carbon dioxide sorption state of the sorption device (12) based on the output of the in-cabin $CO_2$ concentration sensor (31) (ST6), to estimate a moisture sorption state of the sorption device based on the output of the in-cabin absolute humidity estimator (35a) (ST7), and to start execution of the first regeneration mode or the second regeneration mode (ST10, ST14) when at least one of the estimated carbon dioxide sorption state and the estimated moisture sorption state has reached a predetermined threshold value (e.g., 95%) (ST8: Yes).

According to this arrangement, it is possible to prevent the moisture sorption state and carbon dioxide sorption state of the sorbent from becoming higher than the predetermined threshold value.

In the above arrangement, preferably, the sorbent releases the sorbed carbon dioxide at the second regeneration temperature, the air purification device further comprises a fogging detector (36) that detects glass fogging, and the controller (35) is configured to execute the first regeneration mode (ST10) when the fogging detector detects glass fogging (ST9: Yes), and to execute the second regeneration mode (ST14) when the fogging detector detects no glass fogging (ST9: No).

According to this arrangement, when the glass fogging is detected, the first regeneration mode is executed promptly to regenerate the sorbent such that the sorbent can sorb moisture in the vehicle cabin. Thereby, the glass fogging can be suppressed effectively. When the glass fogging is not detected, the second regeneration mode, which is performed at the second regeneration temperature than the first regeneration temperature, is executed, and therefore, the energy consumption by the air purification device can be reduced.

In the above arrangement, preferably, the in-cabin absolute humidity estimator (35a) is configured to estimate the absolute humidity in the vehicle cabin based on a number of vehicle occupants and a ride time of the vehicle occupants.

According to this arrangement, even if the temperature sensor and the humidity sensor are not provided, it is possible to estimate the absolute humidity in the vehicle cabin.

In the above arrangement, preferably, the in-cabin absolute humidity estimator (35a) is configured to estimate the absolute humidity in the vehicle cabin based on a state of operation of a wiper.

According to this arrangement, it is possible to estimate the absolute humidity in the vehicle cabin easily without use of the sensors.

In the above arrangement, preferably, the controller (35) is configured such that during traveling of the vehicle, the controller selectively executes the purification mode or the first regeneration mode (ST3, ST10) if an air conditioner is in an inside air recirculation mode in which air outside the vehicle cabin is not admitted into the vehicle cabin (ST2: Yes).

When outside air is admitted into the vehicle cabin, increase in the carbon dioxide concentration and humidity of the air in the vehicle cabin is suppressed. According to the above arrangement, by operating sorption device when the air conditioner is in the inside air recirculation mode, saturation of the sorbent can be suppressed. Therefore, energy consumption for executing the regeneration mode can e reduced.

In the above arrangement, preferably, the controller (35) is configured such that when the vehicle is stopped, the controller starts execution of the first regeneration mode (ST22) when power feeding to the vehicle from outside is started (ST21: Yes).

According to this arrangement, both the moisture and carbon dioxide sorbed by the sorbent can be discharged to the outside of the vehicle cabin to regenerate the sorbent, without reducing the state of charge of the battery or consuming the fuel in the vehicle.

In the above arrangement, preferably, the controller (35) is configured to terminate the first regeneration mode which is being executed (ST25) when a predetermined time has lapsed (ST24: Yes) from a start of execution of the first regeneration mode (ST22).

According to this arrangement, the determination of whether to terminate the first regeneration mode can be made in a simple manner.

In the above arrangement, preferably, the air purification device further comprises a $CO_2$ sensor (26) provided in the outlet (12b) of the sorption device (12), wherein the controller (35) is configured to terminate the first regeneration mode which is being executed (ST25) when an amount of released $CO_2$ estimated from an output of the $CO_2$ sensor has reached a predetermined value (ST24: Yes).

According to this arrangement, it is possible to determine that the first regeneration mode should be terminated when it is ensured that the amount of carbon dioxide sorbed by the sorbent has been reduced.

In the above arrangement, preferably, the air purification device further comprises a temperature sensor (27) and a humidity sensor (28) provided in the outlet (12b) of the sorption device (12), wherein the controller (35) is configured to terminate the first regeneration mode which is being executed (ST25) when an amount of released moisture estimated based on outputs of the temperature sensor and the humidity sensor has reached a predetermined value (ST24: Yes).

According to this arrangement, it is possible to determine that the first regeneration mode should be terminated when it is ensured that the amount of moisture sorbed by the sorbent has been properly reduced.

Effect of the Invention

Thus, according to an embodiment of the present invention, it is possible to provide an air purification device for a vehicle that can suppress an increase in the carbon dioxide concentration continuously during travel of the vehicle and can suppress fogging of the window glass of the vehicle.

DESCRIPTION OF THE PREFERRED EMBODIMENT(S)

In the following, preferred embodiments of the present invention will be described in detail with reference to the drawings.

First Embodiment

Figure 1:
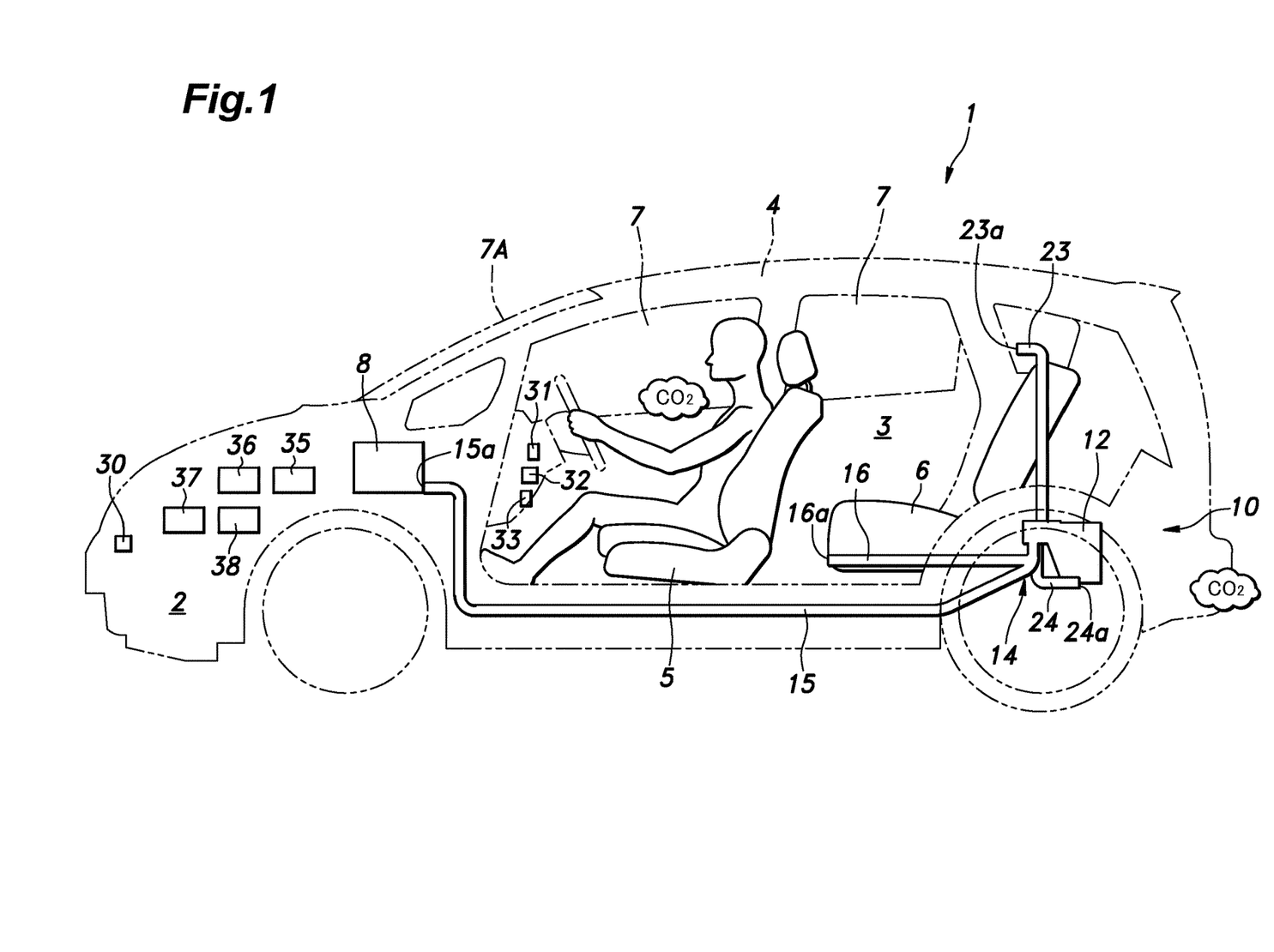
FIG. 1 is a side view of an automobile comprising an air purification device according to a first embodiment of the present invention.

First, with reference to FIGS. 1 to 6, a first embodiment of the present invention will be described. As shown in FIG. 1, an automobile 1 includes a vehicle body 4 having an engine room 2 defined in a front part thereof and a vehicle cabin 3 defined behind the engine room 2. It is to be noted that when the automobile 1 is an electric car, the engine room 2 typically contains an electric motor, a power control unit for controlling the electric motor, a heat exchanger (radiator) for cooling the power control unit, etc. In a case where a plurality of electric motors are used to individually drive the wheels of the automobile 1, the electric motors may be disposed near the respective wheels outside the engine room 2. The automobile 1 of the present embodiment is an electric car or a plug-in hybrid car whose battery can be recharged by plugging it into an external source of electric power.

The vehicle cabin 3 includes a passenger compartment where the driver and passengers are to be seated and a cargo space arranged behind the passenger compartment to be in communication with the passenger compartment. In the vehicle cabin 3, a pair of front seats (one of which is a driver's seat) 5 and a two or three-seater rear seat 6 are arranged in a fore and aft direction in two rows. An upper part of the vehicle body 4 is provided with a plurality of glass windows 7 including a windshield 7A. Further, the automobile 1 is equipped with an air conditioner 8 for controlling the temperature of the air in the vehicle cabin 3 and an air purification device 10 for purifying the air in the vehicle cabin 3.

The air purification device 10 includes an adsorption device 12 (or absorption device) provided with an adsorbent (or absorbent) 11 (see FIG. 2) that, at a purification temperature, adsorbs (or absorbs) moisture and carbon dioxide in the air, and at a regeneration temperature higher than the purification temperature, releases (or desorbs) the adsorbed (or absorbed) moisture and carbon dioxide. In the present embodiment, the adsorption device 12 is mounted under the cargo space. The position where the adsorption device 12 is provided is not limited to this, and may be in the engine room 2 or in the vehicle cabin 3.

Figure 2:
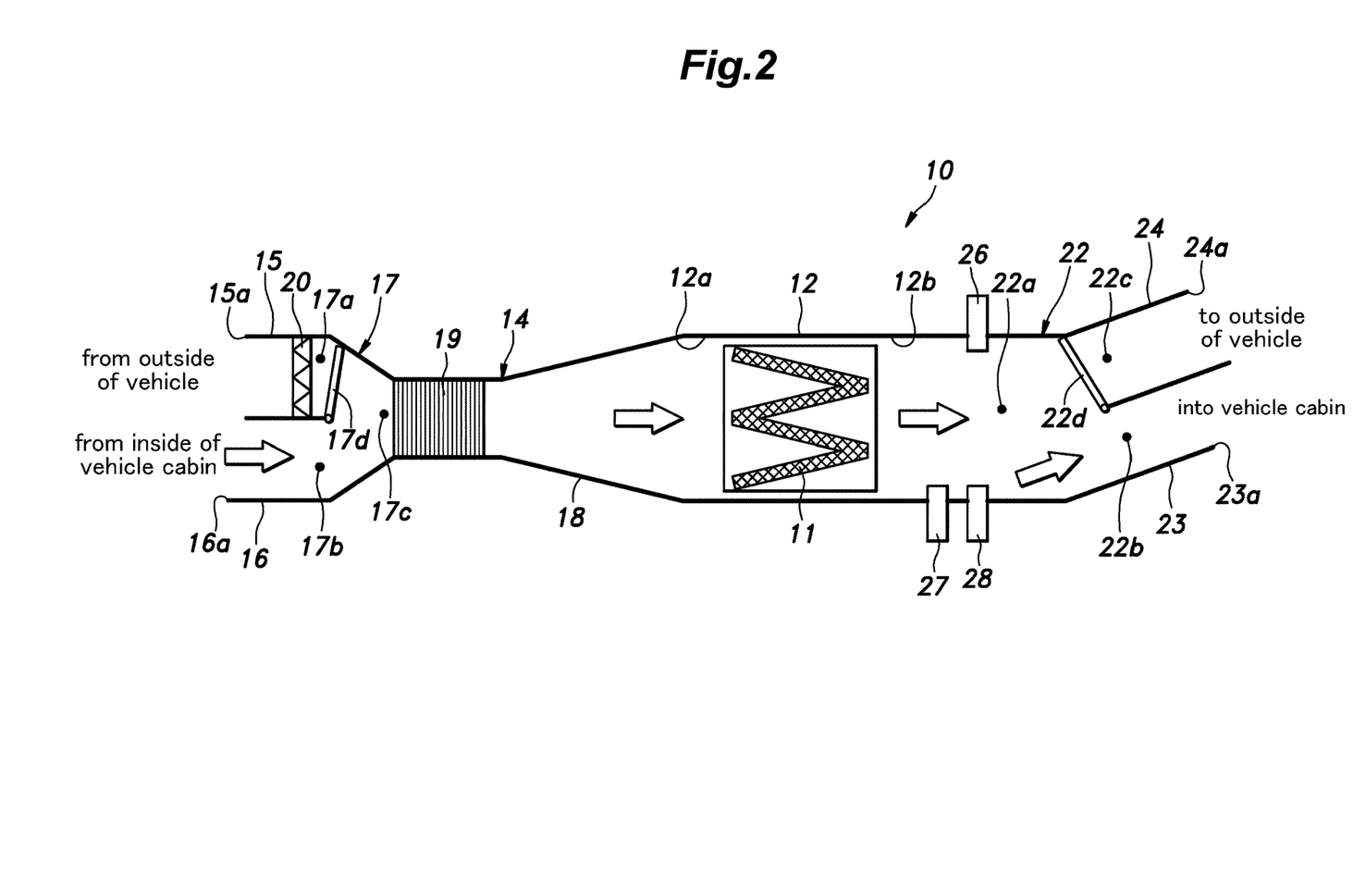
FIG. 2 is a configuration diagram of the air purification device shown in FIG. 1.

With additional reference to FIG. 2, the adsorption device 12 has an inlet 12a and an outlet 12b for air, such that the air entering through the inlet 12a is discharged from the outlet 12b after flowing through the interior of the adsorption device 12. The adsorbent 11 for adsorbing moisture and carbon dioxide in the air is provided in the form of a filter in a part of the adsorption device 12 through which the air flows.

The adsorbent 11 in the present embodiment consists of synthetic zeolite, which adsorbs carbon dioxide and moisture (namely, water in the form of vapor (gas) or liquid) in the air at a normal temperature (e.g., 0 to 30 degrees Celsius), releases the adsorbed carbon dioxide at a second regeneration temperature (e.g., 40 degrees Celsius) higher than the normal temperature, and releases the adsorbed carbon dioxide and moisture at a first regeneration temperature (e.g., 60 degrees Celsius) higher than the normal temperature and the second regeneration temperature. In the present description, "release" means releasing at a rate equal to or higher than a predetermined rate appropriate for regeneration of the adsorbent 11. Therefore, the term "releases carbon dioxide" does not mean that moisture is not released, but includes releasing moisture at a rate lower than a predetermined rate appropriate for regeneration with respect to moisture adsorption capability. Similarly, the term "releases carbon dioxide and moisture" means releasing carbon dioxide at a rate equal to or higher than a predetermined rate appropriate for regeneration with respect to carbon dioxide adsorption capability, and releasing moisture at a rate equal to or higher than the predetermined rate appropriate for regeneration with respect to moisture adsorption capability. Thus, in the adsorbent 11, the first regeneration temperature for releasing moisture (at a rate equal to or higher than the predetermined rate) is different from the second regeneration temperature for releasing carbon dioxide (at a rate equal to or higher than the predetermined rate). It is to be noted that at the first regeneration temperature higher than the second regeneration temperature, the adsorbent 11 releases not only moisture but also carbon dioxide. In the present description, the temperature at which the adsorbent 11 adsorbs carbon dioxide and moisture is referred to as a purification temperature.

It is to be noted that the adsorbent (or absorbent) 11 is not limited to synthetic zeolite. Also, the adsorbent (or absorbent) 11 does not necessarily have to consist of only one component but may comprise two components, for example; one for adsorbing moisture, the other for adsorbing carbon dioxide. Further, the adsorbent (or absorbent) 11 may be liquid or solid.

Examples that can be used as the adsorbent (or absorbent) 11 for adsorbing (or absorbing) carbon dioxide include activated carbon, zeolite, silica sand (silicon), barium orthotitanate, porous cerium oxide, polyamine, potassium carbonate, amine solution, amide-imide solution, alcohol solution, ether solution, ketone solution, carbonate solution, lactone solution, hydrocarbon solution, etc. In the present disclosure, the adsorbents and absorbents may be summarily referred to as sorbents. It is to be noted that the sorbent for sorbing (namely, adsorbing or absorbing) carbon dioxide should have a property of releasing sorbed carbon dioxide at a temperature higher than the temperature at which it sorbs carbon dioxide to purify air.

Examples that can be used as the sorbent for sorbing moisture include activated carbon, zeolite, silica gel, etc. It is to be noted that the sorbent for sorbing moisture should have a property of releasing sorbed moisture at a temperature higher than the temperature at which it sorbs moisture to purify air.

In the illustrated embodiment, an air intake duct 14 is connected to the inlet 12a of the adsorption device 12. The air intake duct 14 includes: an outside air duct 15 having one end connected to an outside air introduction duct of the air conditioner 8 and formed with an outside air suction opening 15a for sucking outside air; an inside air duct 16 having one end formed with an inside air suction opening 16a for sucking air in the vehicle cabin 3; an inlet-side three-way valve 17 (intake passage switching damper) having an outside air input port 17a connected with the outside air duct 15, an inside air input port 17b connected with the inside air duct 16, and an intake air output port 17c; and a common air intake duct 18 extending from the intake air output port 17c of the inlet-side three-way valve 17 to the inlet 12a of the adsorption device 12. The inlet-side three-way valve 17 selectively closes the inside air input port 17b or the outside air input port 17a with a valve body 17d (damper driven by an actuator) and thereby switches an intake passage to admit the inside air or the outside air. A blower 19 is provided in the common air intake duct 18 for sending air into the adsorption device 12, and a heater 20 is provided in the outside air duct 15 to heat the outside air supplied to the adsorption device 12 through the outside air duct 15.

Provided at the outlet 12b of the adsorption device 12 is an outlet-side three-way valve 22 (discharge passage switching damper) having an input port 22a connected to the outlet 12b of the adsorption device 12, a first output port 22b, and a second output port 22c. The first output port 22b of the outlet-side three-way valve 22 is connected with one end of an air supply duct 23, and the second output port 22c of the outlet-side three-way valve 22 is connected with one end of an exhaust duct 24. The other end of the air supply duct 23 is formed with a blowing opening 23a for blowing air into the vehicle cabin 3, and the other end of the exhaust duct 24 is formed with an exhaust opening 24a for discharging air to the outside of the vehicle cabin 3. The outlet-side three-way valve 22 selectively closes the first output port 22b or the second output port 22c with a valve body 22d (damper driven by an actuator) and thereby switches a discharge passage for the air that has passed through the adsorption device 12 to discharge the air to the inside or the outside of the vehicle cabin 3.

The input port 22a of the outlet-side three-way valve 22 (or the outlet 12b of the adsorption device 12) is provided with a CO2 sensor 26 for detecting the carbon dioxide concentration of the air having flowed through the adsorption device 12, a temperature sensor 27 for detecting the temperature of the air, and a humidity sensor 28 for detecting the humidity (relative humidity) of the air.

As shown in FIG. 1, the automobile 1 is provided at appropriate portions thereof with an outside air temperature sensor 30 that detects the temperature of the outside air, an in-cabin CO2 sensor 31 that detects the carbon dioxide concentration in the vehicle cabin 3, an in-cabin temperature sensor 32 that detects the temperature in the vehicle cabin 3, and an in-cabin humidity sensor 33 that detects the humidity (relative humidity) in the vehicle cabin 3. The outputs from the in-cabin temperature sensor 32 and the in-cabin humidity sensor 33 are used by the controller 35 (in-cabin absolute humidity estimator 35a) to estimate an absolute humidity in the vehicle cabin 3, as described in detail later. In addition, the automobile 1 is provided with a controller 35 that controls an operation of the adsorption device 12 by drive-controlling the inlet-side three-way valve 17, the outlet-side three-way valve 22, the blower 19, and the heater 20. The automobile 1 is further provided with an air conditioner ECU 36 that controls the air conditioner 8, a battery ECU 37 that controls charging and discharging of the battery and monitors the charge state of the battery, and a main ECU 38 that controls the state of power supply of the automobile 1 and an operation of a wiper of the automobile 1.

Figure 3:
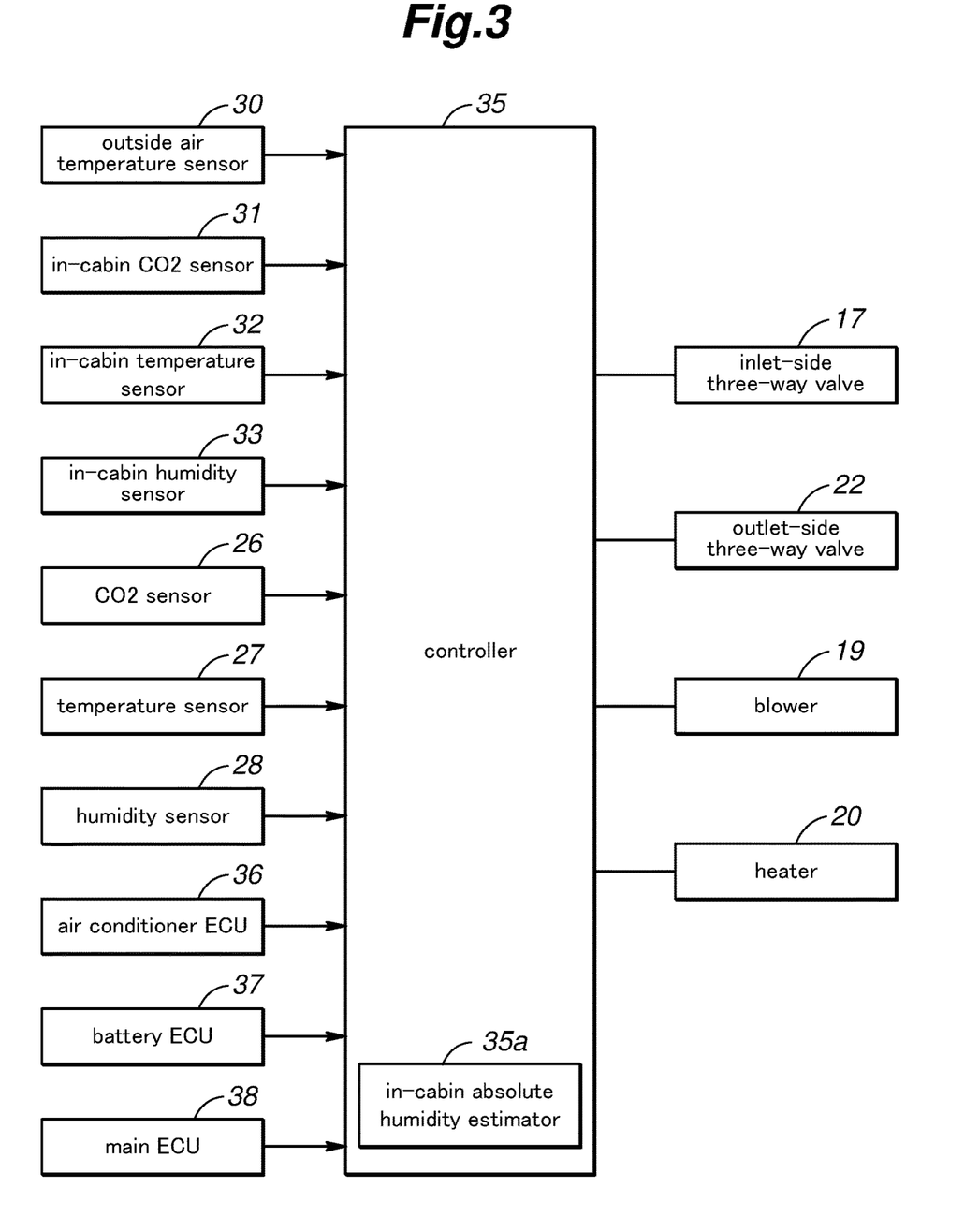
FIG. 3 is a control block diagram of the air purification device shown in FIG. 1.

FIG. 3 is a control block diagram of the air purification device 10. The controller 35 is an electronic circuit unit including a CPU and a memory such as a RAM and a ROM. The CPU is programmed to read necessary data and application software from the memory, and executes processing according to the software.

The controller 35 is configured to receive detection signals from the outside air temperature sensor 30, the in-cabin CO2 sensor 31, the in-cabin temperature sensor 32, the in-cabin humidity sensor 33, the CO2 sensor 26, the temperature sensor 27, and the humidity sensor 28. Further, the controller 35 is configured to be capable of communicating with the air conditioner ECU 36, the battery ECU 37, and the main ECU 38, such that various signals, such as an air conditioning mode signal indicating a mode of the air conditioner 8 recognized by the air conditioner ECU 36, a charging signal indicating an external charging state recognized by the battery ECU 37, and a wiper operation signal indicating an operation of the wiper recognized by the main ECU 38, are input to the controller 35.

The controller 35 drive-controls the inlet-side three-way valve 17, the outlet-side three-way valve 22, the blower 19, and the heater 20 in accordance with these input signals. Specifically, the controller 35 selectively executes a purification mode, a first regeneration mode, and a second regeneration mode. In the purification mode, air in the vehicle cabin 3 is sent into the adsorption device 12 at the purification temperature, and purified air from which moisture and carbon dioxide have been removed by the adsorbent 11 is blown into the vehicle cabin 3. In the first regeneration mode, air heated to the first regeneration temperature is sent into the adsorption device 12, and exhaust air containing carbon dioxide and moisture released from the adsorbent 11 is discharged to the outside of the vehicle cabin 3. In the second regeneration mode, air heated to the second regeneration temperature is sent into the adsorption device 12, and exhaust air containing carbon dioxide released from the adsorbent 11 is discharged to the outside of the vehicle cabin 3.

Figure 4A:
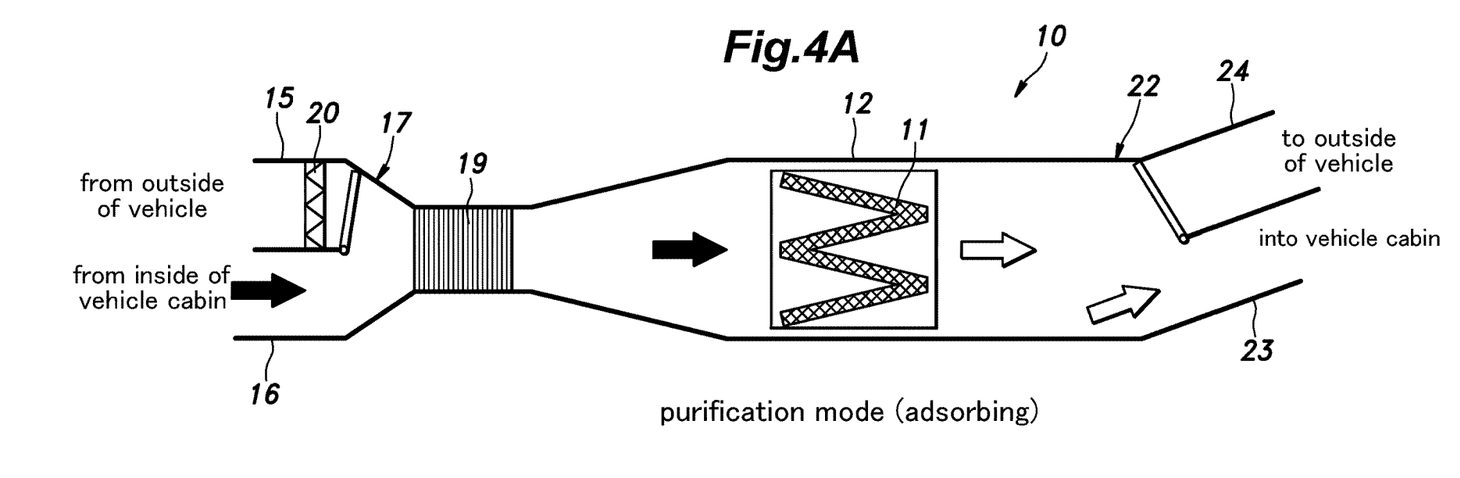
FIGS. 4A and 4B are diagrams for explaining an operation of the air purification device shown in FIG. 1.

FIGS. 4A and 4B are diagrams for explaining an operation of the air purification device 10. As shown in FIG. 4A, when executing the purification mode, the controller 35 controls the inlet-side three-way valve 17 to close the outside air duct 15 and open the inside air duct 16, and controls the outlet-side three-way valve 22 to close the exhaust duct 24 and open the air supply duct 23. Then, the controller 35 drives the blower 19 without driving the heater 20, to thereby control the adsorption device 12 in the purification mode. In the purification mode, air in the vehicle cabin 3 is supplied to the adsorption device 12, in which the adsorbent 11 adsorbs carbon dioxide and moisture contained in the air, and the air having a reduced carbon dioxide concentration and humidity is returned to the vehicle cabin 3.

Figure 4B:
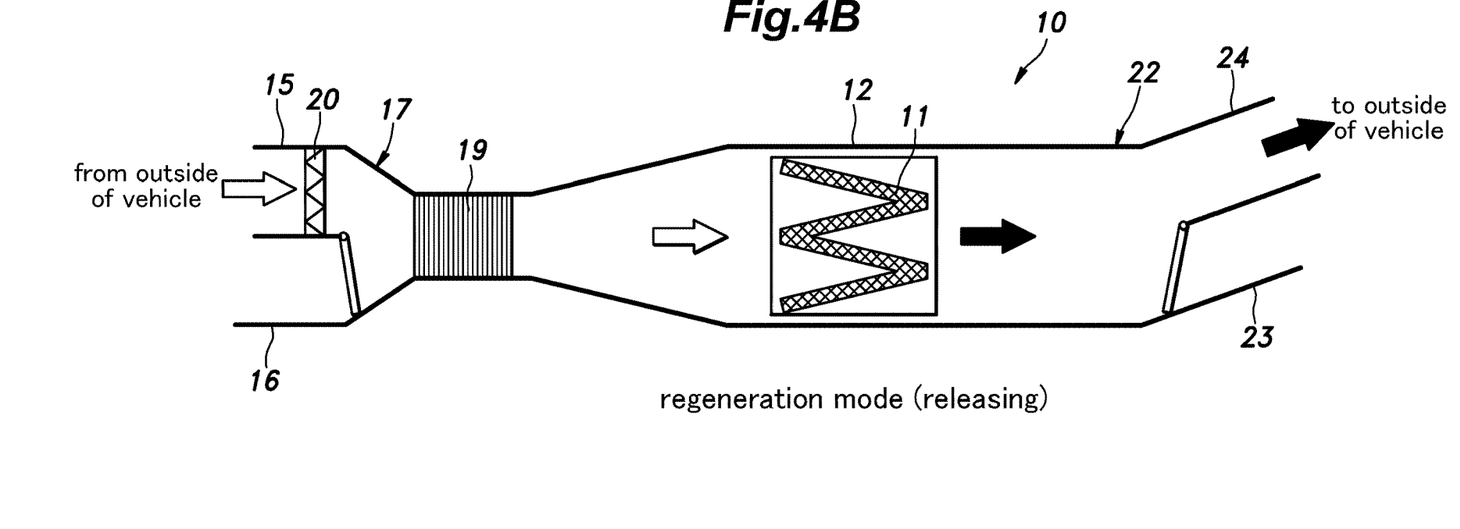

As shown in FIG. 4B, when executing the regeneration mode (first or second regeneration mode), the controller 35 controls the inlet-side three-way valve 17 to close the inside air duct 16 and open the outside air duct 15, and controls the outlet-side three-way valve 22 to close the air supply duct 23 and open the exhaust duct 24. Then, the controller 35 drives the heater 20 and the blower 19, to thereby control the adsorption device 12 in the regeneration mode. In the regeneration mode, air outside the vehicle cabin 3 is heated and the heated air is supplied to the adsorption device 12. When executing the first regeneration mode, the controller 35 controls the heater 20 and the blower 19 such that the air supplied to the adsorption device 12 is at the first regeneration temperature (60 degrees Celsius). Thereby, air containing carbon dioxide and moisture released from the adsorbent 11 is discharged to the outside of the vehicle cabin 3. When executing the second regeneration mode, the controller 35 controls the heater 20 and the blower 19 such that the air supplied to the adsorption device 12 is at the second regeneration temperature (40 degrees Celsius). Thereby, air containing carbon dioxide released from the adsorbent 11 is discharged to the outside of the vehicle cabin 3.

Next, the processing procedure executed by the controller 35 to selectively execute the three modes will be described with reference to the flowcharts shown in FIGS. 5 and 6.

Figure 5:
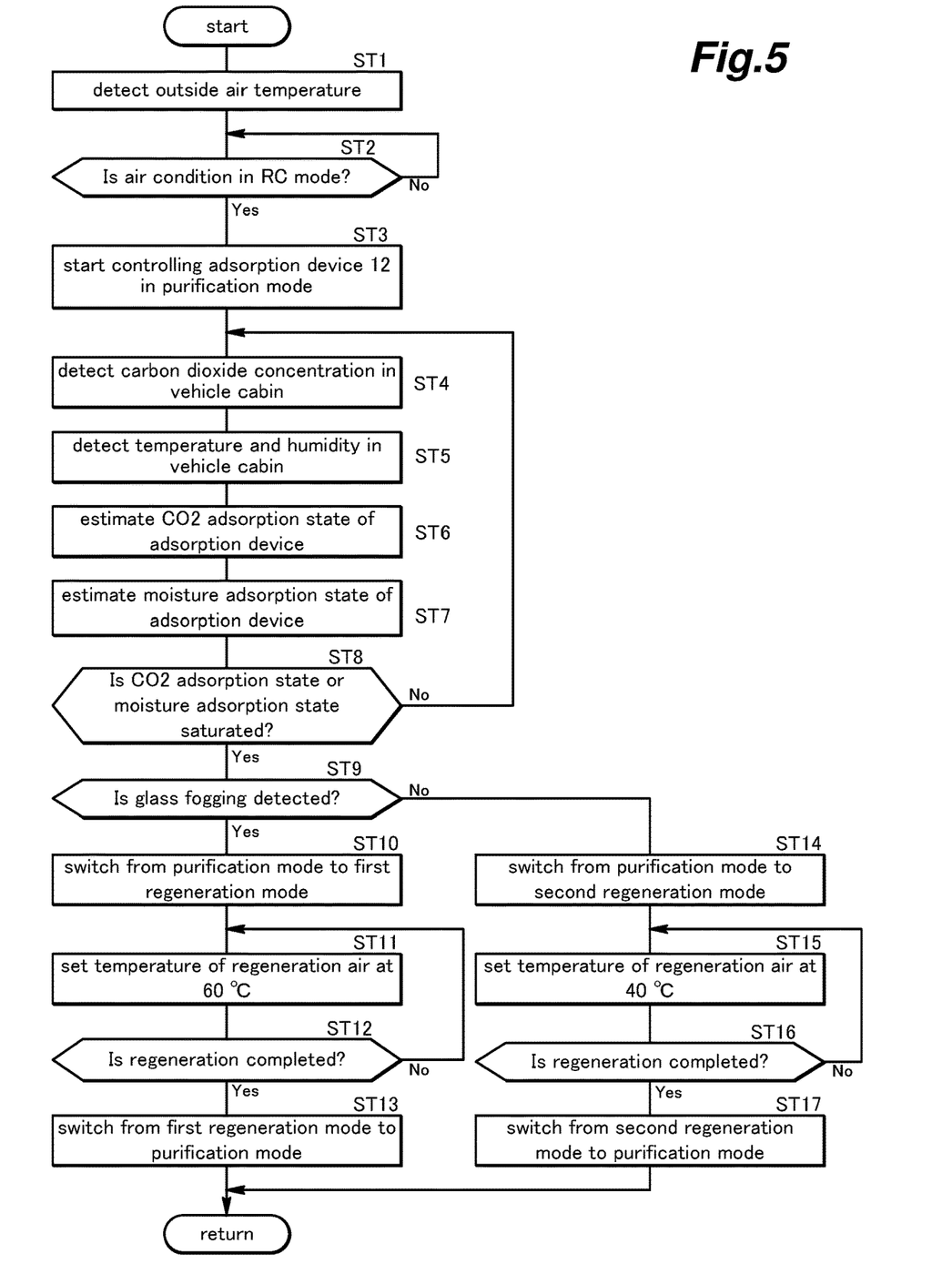
FIG. 5 is a flowchart showing a processing procedure executed by a controller shown in FIG. 1 when the automobile is traveling.

FIG. 5 is a flowchart showing a processing procedure executed when the automobile 1 is traveling. When the automobile 1 is traveling, the controller 35 first detects the outside air temperature using the outside air temperature sensor 30 (step ST1). Subsequently, the controller 35 determines whether the air conditioner 8 is in the inside air recirculation mode (RC mode) based on the air conditioning mode signal sent from the air conditioner ECU 36 (step ST2). If the air conditioner 8 is not in the inside air recirculation mode (step ST2: No), the controller 35 repeats the process of step ST2. If the air conditioner 8 is in the inside air recirculation mode (step ST2: Yes), the controller 35 starts control of the adsorption device 12 in the purification mode (step ST3).

In the present embodiment, it is required that the air conditioner 8 be in the inside air recirculation mode to start the purification mode during traveling of the automobile 1 because when the air conditioner 8 is not in the inside air recirculation mode, the outside air introduced into the vehicle cabin 3 suppresses an increase in the carbon dioxide concentration and humidity in the vehicle cabin 3, and therefore, there is little need to operate the adsorption device 12 in the purification mode to suppress an increase in the carbon dioxide concentration and humidity. In addition, if the adsorption device 12 were always operated in the purification mode, the adsorbent 11 would be saturated quickly, and it would be required to regenerate the adsorbent 11 frequently, which would consume more energy and reduce the energy efficiency. By starting the purification mode subject to a condition that the air conditioner 8 is executing the inside air recirculation mode, saturation of the adsorbent 11 is suppressed, and hence, energy consumption for executing the regeneration mode can be reduced.

Once the control in the purification mode is started in step ST3, the controller 35 detects the carbon dioxide concentration in the vehicle cabin 3 based on the output of the in-cabin CO2 sensor 31 (step ST4), and detects the temperature and humidity in the vehicle cabin 3 based on the outputs of the in-cabin temperature sensor 32 and the in-cabin humidity sensor 33, respectively (step ST5). Subsequently, the controller 35 estimates (or computes) a carbon dioxide adsorption state (CO2 adsorption state) of the adsorption device 12 (or the adsorbent 11) based on the detected carbon dioxide concentration in the vehicle cabin 3 (step ST6), and estimates (or computes) a moisture adsorption state of the adsorption device 12 (or the adsorbent 11) based on the detected temperature and humidity in the vehicle cabin 3 (step ST7). The estimated carbon dioxide adsorption state and moisture adsorption state are stored in the memory.

It is to be noted here that the carbon dioxide adsorption state can be represented by a ratio of an amount of CO2 currently adsorbed (or held) by the adsorbent 11 housed in the adsorption device 12 to the maximum amount of CO2 that can be adsorbed by the adsorbent 11. Also, the moisture adsorption state can be represented by a ratio of an amount of moisture currently adsorbed (or held) by the adsorbent 11 housed in the adsorption device 12 to the maximum amount of moisture that can be adsorbed by the adsorbent 11.

The controller 35 computes an increment of the carbon dioxide adsorption state of the adsorption device 12 at predetermined intervals based on the carbon dioxide concentration in the vehicle cabin 3 detected by the in-cabin CO2 sensor 31, and adds the computed increment to the carbon dioxide adsorption state stored in the memory to thereby update the carbon dioxide adsorption state of the adsorption device 12 at predetermined intervals. Also, the controller 35 estimates (or computes) an absolute humidity (volumetric humidity) in the vehicle cabin 3 based on the temperature and humidity in the vehicle cabin 3 detected by the in-cabin temperature sensor 32 and the in-cabin humidity sensor 33 (thus, the controller 35 functions as the in-cabin absolute humidity estimator 35a), computes an increment of the moisture adsorption state of the adsorption device 12 based on the computed absolute humidity at predetermined intervals, and adds the computed increment to the moisture adsorption state stored in the memory to thereby update the moisture adsorption state of the adsorption device 12 at predetermined intervals.

The controller 35 determines whether the estimated carbon dioxide adsorption state or the estimated moisture adsorption state is saturated; specifically, the controller 35 determines whether the carbon dioxide adsorption state or the moisture adsorption state of the adsorbent 11 has reached a predetermined threshold value (e.g., 95%) serving as a reference for saturation (step ST8). If neither the carbon dioxide adsorption state nor the moisture adsorption state is saturated (step ST8: No), the controller 35 repeats the procedure from step ST4. On the other hand, if the carbon dioxide adsorption state or the moisture adsorption state is saturated (step ST8: Yes), the controller 35 determines whether glass fogging is detected based on a glass fogging signal transmitted from the air conditioner ECU 36 (step ST9).

It is to be noted here that glass fogging indicates a state where some of the glass windows 7 are foggy or about to become foggy due to condensation of moisture in the vehicle cabin 3, and is estimated by the air conditioner ECU 36 as a glass fogging index based on the outside air temperature, vehicle speed, temperature in the vehicle cabin 3, etc. Thus, the air conditioner ECU 36 functions as a fogging detector that detects fogging of the glass windows 7. The air conditioner ECU 36 estimates the glass fogging index, and transmits the estimated glass fogging index to the controller 35 as the glass fogging signal. The controller 35 determines that the glass fogging is detected when the glass fogging index transmitted from the air conditioner ECU 36 is equal to or greater than a predetermined value, and determines that the glass fogging is not detected when the glass fogging index is less than the predetermined value.

If it is determined in step ST9 that the glass fogging is detected (Yes), the controller 35 switches the control mode of the adsorption device 12 from the purification mode to the first regeneration mode (step ST10), and sets the temperature of regeneration air sent to the adsorption device 12 at 60 degrees Celsius (step ST11). Thereby, the outside air taken in through the outside air suction opening 15a and heated by the heater 20 to 60 degrees Celsius is sent to the adsorption device 12, and the adsorbent 11 is regenerated by releasing carbon dioxide and moisture. Exhaust air containing carbon dioxide and moisture released by the adsorbent 11 passes through the exhaust duct 24 and is discharged from the exhaust opening 24a to the outside of the vehicle cabin 3. As described above, when the glass fogging is detected (step ST9:Yes), the first regeneration mode is executed promptly to release moisture from the adsorbent 11, such that the adsorbent 11 can adsorb moisture in the vehicle cabin 3. Thereby, the glass fogging can be suppressed effectively.

Thereafter, the controller 35 determines whether the regeneration of the adsorbent 11 is completed based on whether a predetermined time has lapsed from the start of execution of the first regeneration mode in step ST10 (step ST12). If the predetermined time has not lapsed from the start of execution of the first regeneration mode (step ST12: No), the controller 35 maintains the regeneration air temperature at 60 degrees Celsius set in step ST11. If the predetermined time has lapsed from the start of execution of the first regeneration mode (step ST12: Yes), the controller 35 switches the control mode of the adsorption device 12 from the first regeneration mode to the purification mode (step ST13), and repeats the above-described procedure. When switching the control mode in step ST13, the controller 35 resets the carbon dioxide adsorption state and the moisture adsorption state stored in the memory to zero.

On the other hand, if it is determined in step ST9 that the glass fogging is not detected (No), the controller 35 switches the control mode of the adsorption device 12 from the purification mode to the second regeneration mode (step ST14), and sets the temperature of the regeneration air sent to the adsorption device 12 at 40 degrees Celsius (step ST15). Thereby, the outside air taken in through the outside air suction opening 15a and heated by the heater 20 to 40 degrees Celsius is sent to the adsorption device 12, and the adsorbent 11 is regenerated with respect to the carbon dioxide adsorbing function by releasing carbon dioxide. Exhaust air containing carbon dioxide released from the adsorbent 11 passes through the exhaust duct 24 and is discharged from the exhaust opening 24a to the outside of the vehicle cabin 3.

Thereafter, the controller 35 determines whether the regeneration of the adsorbent 11 with respect to the carbon dioxide adsorbing function is completed based on whether a predetermined time has lapsed from the start of execution of the second regeneration mode in step ST14 (step ST16). If the predetermined time has not lapsed from the start of execution of the second regeneration mode (step ST16: No), the controller 35 maintains the regeneration air temperature at 40 degrees Celsius set in step ST15. If the predetermined time has lapsed from the start of execution of the second regeneration mode (step ST16: Yes), the controller 35 switches the control mode of the adsorption device 12 from the second regeneration mode to the purification mode (step ST17), and repeats the above-described procedure. When switching the control mode in step ST17, the controller 35 resets the carbon dioxide adsorption state stored in the memory to zero, while maintaining the moisture adsorption state stored in the memory.

As described above, the controller 35 estimates the carbon dioxide adsorption state of the adsorption device 12 in step ST6 based on the output of the in-cabin CO2 sensor 31, and estimates the moisture adsorption state of the adsorption device 12 in step ST7 based on the outputs of the in-cabin temperature sensor 32 and the in-cabin humidity sensor 33. And, if at least one of the estimated carbon dioxide adsorption state and moisture adsorption state has reached the predetermined threshold value (e.g., 95%) (step ST8: Yes), the controller 35 starts executing the first regeneration mode in step ST10 or the second regeneration mode in step ST14, to prevent the moisture adsorption state and the carbon dioxide adsorption state of the adsorbent 11 from becoming higher than the predetermined threshold value.

In step ST6, the controller 35 estimates the carbon dioxide adsorption state of the adsorption device 12 based on the carbon dioxide concentration in the vehicle cabin 3 detected by the in-cabin CO2 sensor 31 in step ST4. Therefore, the carbon dioxide adsorption state of the adsorption device 12 can be estimated accurately.

Further, in step ST7, the controller 35 estimates the moisture adsorption state of the adsorption device 12 based on the absolute humidity in the vehicle cabin 3, which is estimated based on the temperature and humidity in the vehicle cabin 3 detected by the in-cabin temperature sensor 32 and the in-cabin humidity sensor 33, respectively, in step ST5. Therefore, the absolute humidity in the vehicle cabin 3 can be estimated accurately, and the moisture adsorption state of the adsorption device 12 can be estimated accurately.

Figure 6:
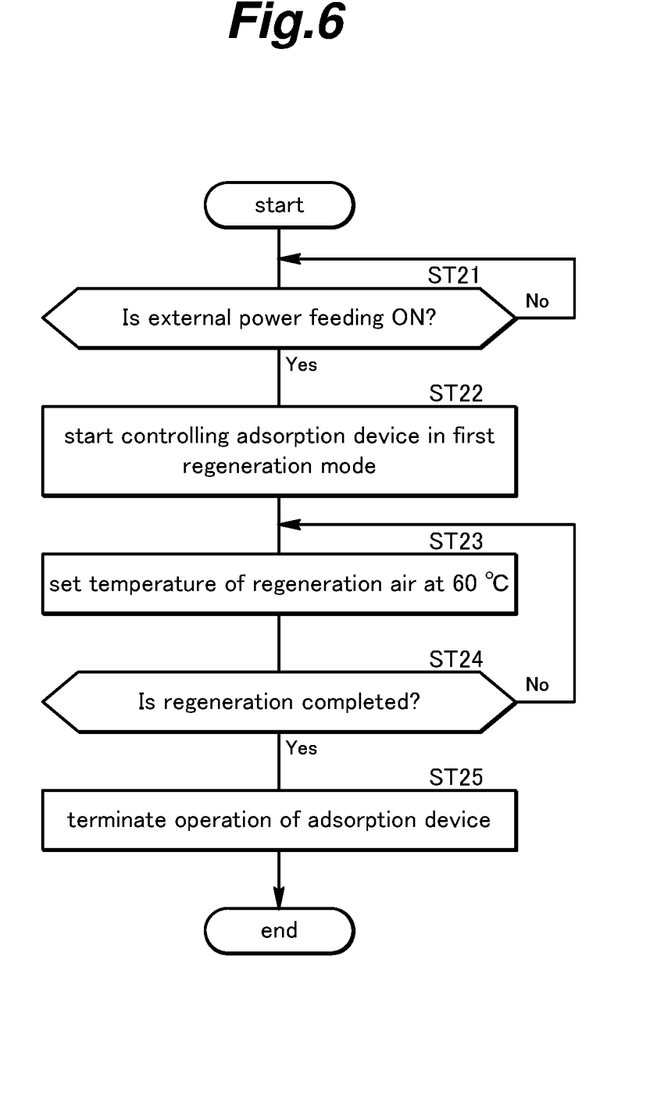
FIG. 6 is a flowchart showing a processing procedure executed by the controller shown in FIG. 1 when the automobile is stopped.

FIG. 6 is a flowchart showing a processing procedure executed when the automobile 1 is stopped. When the automobile 1 is stopped, the controller 35 determines whether external power feeding is ON based on whether an external power feed signal is transmitted from the main ECU 38 (step ST21). If the external power feeding is not being performed (step ST21: No), the controller 35 repeats the processing in step ST21 without proceeding further. If the external power feeding is being performed (step ST21: Yes), the controller 35 starts control of the adsorption device 12 in the first regeneration mode (step ST22), and sets the temperature of the regeneration air sent to the adsorption device 12 at 60 degrees Celsius (step ST23).

In the present embodiment, it is required that the external power feeding be ON to start the first regeneration mode when the automobile 1 is stopped because this can allow the adsorbent 11 to be regenerated without consuming the energy stored in the automobile 1. Therefore, when the automobile 1 is stopped, control in the first regeneration mode may be started regardless of whether the air conditioner 8 is in the inside air recirculation mode. Thus, since the controller 35 is configured to start executing the first regeneration mode in step ST22 when power feeding to the automobile 1 from outside is started (step ST21: Yes), both the moisture and carbon dioxide adsorbed by the adsorbent 11 can be discharged to the outside of the vehicle cabin 3 to regenerate the adsorbent 11, without reducing the state of charge of the battery or consuming the fuel in the automobile 1.

Thereafter, the controller 35 determines whether the regeneration of the adsorbent 11 is completed based on whether a predetermined time has lapsed from the start of execution of the first regeneration mode in step ST22 (step ST24). If the predetermined time has not lapsed from the start of execution of the first regeneration mode (step ST24:

No), the controller 35 maintains the regeneration air temperature at 60 degrees Celsius set in step ST23. If the predetermined time has lapsed from the start of execution of the first regeneration mode (step ST24: Yes), the controller 35 terminates the operation (control) of the adsorption device 12 in step ST25. When terminating the control in step ST25, the controller 35 resets the carbon dioxide adsorption state and moisture adsorption state stored in the memory to zero.

As described above, the controller 35 is configured to terminate the first regeneration mode which is being executed in step ST25 when the predetermined time has lapsed from the start of execution of the first regeneration mode in step ST22 (step ST24: Yes), and therefore, the determination of whether to terminate the first regeneration mode can be made in a simple manner.

Next, technical advantages of the air purification device 10 configured as described above will be described.

As shown in FIG. 4A, the controller 35 is configured to execute the purification mode (step ST3) in which air in the vehicle cabin 3 is sent into the adsorption device 12 at the purification temperature, and purified air from which moisture and carbon dioxide have been removed by the adsorbent 11 is blown into the vehicle cabin 3. Thereby, moisture and carbon dioxide in the air in the vehicle cabin 3 are adsorbed by the adsorbent 11, and therefore, an increase in the carbon dioxide concentration and humidity in the vehicle cabin 3 can be suppressed. In addition, fogging of the glass windows 7 can be prevented. Further, as shown in FIG. 4B, the controller 35 is configured to execute the first regeneration mode (step ST10) in which air heated to the first regeneration temperature is sent into the adsorption device 12, and exhaust air containing moisture and carbon dioxide released from the adsorbent 11 is discharged to the outside of the vehicle cabin 3. Thereby, the exhaust air containing moisture and carbon dioxide released from the adsorbent 11 can be discharged to the outside of the vehicle cabin 3 to regenerate the adsorbent 11 without removing the adsorbent 11 (or the adsorption device 12 containing the adsorbent 11 therein) to the outside of the automobile 1, it is possible to suppress an increase in the carbon dioxide concentration and humidity continuously during traveling of the automobile 1.

In the present embodiment, the controller 35 selectively execute the purification mode in step ST3, the first regeneration mode in step ST10, and the second regeneration mode in step ST14 based on the outputs of the in-cabin CO2 sensor 31 and the in-cabin humidity sensor 33. Thereby, it is possible to prevent the adsorbent 11 from becoming saturated or being left saturated with moisture and/or carbon dioxide. Further, because in the second regeneration mode the controller 35 controls the heater 20 to heat the air to the second regeneration temperature lower than the first regeneration temperature, the energy required for heating can be reduced.

Second Embodiment

Next, with reference to FIGS. 7A and 7B, a second embodiment of the present invention will be described. In the description of the second embodiment, elements same as or similar to those of the first embodiment will be denoted by the same reference signs and a redundant explanation will be omitted.

Figure 7A:
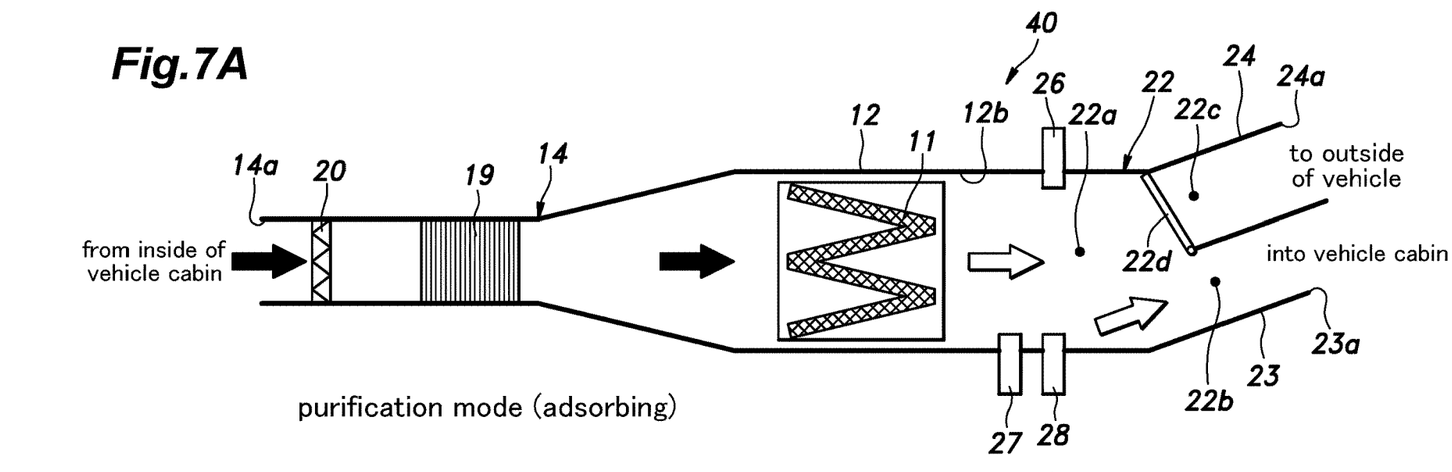
FIGS. 7A and 7B are diagrams for explaining an operation of an air purification device for a vehicle according to a second embodiment of the present invention.
Figure 7B:
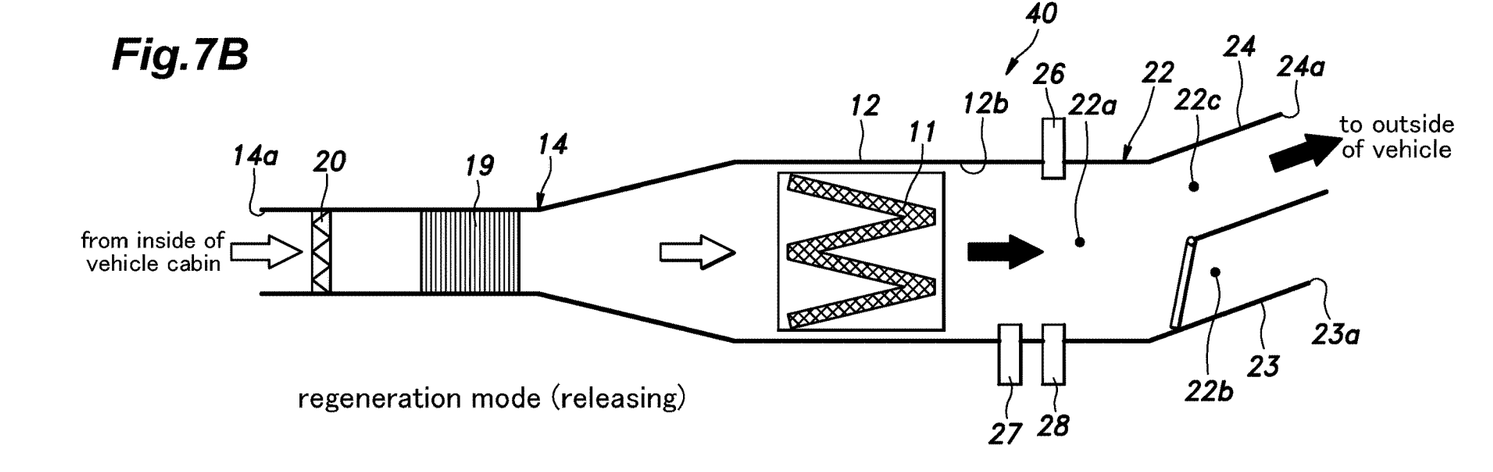

FIGS. 7A and 7B are diagrams for explaining an operation of an air purification device 40 for a vehicle according to the second embodiment of the present invention, in which FIG. 7A shows an operation during execution of the purification mode, and FIG. 7B shows an operation during execution of the regeneration mode (first or second regeneration mode). First, with reference to FIG. 7A, the structure of an air purification device 40 for a vehicle according to the second embodiment will be described. In the second embodiment, the air intake duct 14 is embodied as a single duct having one end formed with an inside air suction opening 14a for sucking air in the vehicle cabin 3, and does not include the outside air duct 15, the inside air duct 16, and the inlet-side three-way valve 17 shown in FIG. 2. The heater 20 and the blower 19 are provided in the air intake duct 14 in this order from the upstream side. The other structure is the same as that of the first embodiment.

As shown in FIG. 7A, when executing the purification mode, the controller 35 controls the outlet-side three-way valve 22 to close the exhaust duct 24 and open the air supply duct 23, and drives the blower 19 without driving the heater 20, to thereby control the adsorption device 12 in the purification mode. In the purification mode, the air in the vehicle cabin 3 is supplied to the adsorption device 12, in which the adsorbent 11 adsorbs carbon dioxide and moisture contained in the air, and the air having a reduced carbon dioxide concentration and humidity is returned to the vehicle cabin 3.

As shown in FIG. 7B, when executing the regeneration mode (first or second regeneration mode), the controller 35 controls the outlet-side three-way valve 22 to close the air supply duct 23 and open the exhaust duct 24, and drives the heater 20 and the blower 19, to thereby control the adsorption device 12 in the regeneration mode. In the regeneration mode, the air in the vehicle cabin 3 is heated such that the heated air is supplied to the adsorption device 12, whereby air containing at least carbon dioxide released from the adsorbent 11 is discharged to the outside of the vehicle cabin 3. It is to be noted that because the pressure in the vehicle cabin 3 is lowered, air outside the vehicle cabin 3 flows into the vehicle cabin 3 through gaps in the vehicle body 4 and gaps in the outside air introduction duct of the air conditioner 8.

As in the first embodiment, when executing the first regeneration mode, the controller 35 drives the heater 20 such that the air supplied to the adsorption device 12 is at the first regeneration temperature (60 degrees Celsius), and when executing the second regeneration mode, the controller 35 drives the heater 20 such that the air supplied to the adsorption device 12 is at the second regeneration temperature (40 degrees Celsius). It is to be noted that in the air purification device 40 of the second embodiment, the air in the vehicle cabin 3 is heated instead of the air outside the vehicle cabin 3, and therefore, the electric power necessary for the heating can be reduced compared to the first embodiment. Further, unlike the first embodiment, it is unnecessary to provide the outside air duct 15 and the inlet-side three-way valve 17, and therefore, the structure of the air purification device 40 can be simplified.

The concrete embodiments of the present invention have been described in the foregoing, but the present invention is not limited to the embodiments and may be modified in various ways.

For example, in the above embodiments, the controller 35 (in-cabin absolute humidity estimator 35a) is configured to estimate the moisture adsorption state of the adsorption device 12 in step ST7 based on the temperature and humidity in the vehicle cabin 3 detected by the in-cabin temperature sensor 32 and the in-cabin humidity sensor 33 in step ST5, but in-cabin absolute humidity estimator 35a may estimate the absolute humidity in the vehicle cabin 3 based on the number of vehicle occupants and the ride time of the vehicle occupants (time period for which the vehicle occupants are in the vehicle cabin 3). Thereby, without the in-cabin temperature sensor 32 and the in-cabin humidity sensor 33 provided in the vehicle cabin 3, it is possible to estimate the absolute humidity in the vehicle cabin 3.

Alternatively, the in-cabin absolute humidity estimator 35a may estimate (or determine) that the absolute humidity in the vehicle cabin 3 is high when it is determined that the wire is in operation based on a signal indicating a status of operation of the wiper transmitted from the main ECU 38. Thereby, it is possible to estimate the absolute humidity in the vehicle cabin 3 easily without use of the sensors.

Further, in the above embodiments, the controller 35 is configured to terminate the first regeneration mode which is being executed in step ST25 when a predetermined time has lapsed from the start or execution of the first regeneration mode in step ST22 (step ST24:Yes), but the controller 35 may be configured to estimate an amount of released CO2 based on the output of the CO2 sensor 26 provided in the outlet 12b of the adsorption device 12, and to terminate the first regeneration mode which is being executed when the estimate amount of released CO2 has reached a predetermined value. Thereby, it is possible to determine that the first regeneration mode should be terminated when it is ensured that the amount of carbon dioxide adsorbed by the adsorbent 11 has been properly reduced.

Alternatively, the controller 35 may be configured to estimate an amount of released moisture based on the outputs of the temperature sensor 27 and the humidity sensor 28 provided in the outlet 12b of the adsorption device 12, and to terminate the first regeneration mode which is being executed when the estimated amount of released moisture has reached a predetermined value. Thereby, it is possible to determine that the first regeneration mode should be terminated when it is ensured that the amount of moisture adsorbed by the adsorbent 11 has been properly reduced.

Further, in the above embodiments, when the controller 35 controls the adsorption device 12 in purification mode, the controller 35 drives only the blower 19 without driving the heater 20, but the controller 35 may be configured to drive the heater 20 together with the blower 19 to heat the air for purification to a temperature appropriate for the adsorbent 11 to adsorb carbon dioxide and/or moisture.

In the above embodiment, the present invention was applied to the hatchback-type automobile 1 in which a rear part of the vehicle cabin 3 forms a cargo space, but in another embodiment, a cargo room separate from the vehicle cabin 3 may be provided. The concrete structure, arrangement, number, material, etc. of the component parts of the embodiment may be appropriately changed within the scope of the present invention. Also, not all of the component parts shown in the foregoing embodiment are necessarily indispensable, and they may be selectively used as appropriate.

The invention claimed is:

1. An air purification device for a vehicle, comprising:
a sorption device provided with a sorbent that sorbs moisture and carbon dioxide in air at a purification temperature and releases the sorbed moisture and carbon dioxide at a first regeneration temperature higher than the purification temperature;
an air intake duct having one end formed with at least a suction opening for sucking air in a vehicle cabin and another end connected to an inlet of the sorption device;
a three-way valve having an input port connected to an outlet of the sorption device;
an air supply duct having one end connected to a first output port of the three-way valve and another end formed with a blowing opening for blowing air into the vehicle cabin;
an exhaust duct having one end connected to a second output port of the three-way valve and another end formed with an exhaust opening for discharging air to outside of the vehicle cabin;
a blower for sending air from the air intake duct into the sorption device;
a heater for selectively heating air sent into the sorption device; and
a controller configured to control the three-way valve, the blower, and the heater to thereby selectively execute a purification mode in which air in the vehicle cabin is sent into the sorption device at the purification temperature, and purified air from which moisture and carbon dioxide have been removed by the sorbent is blown into the vehicle cabin, and a first regeneration mode in which air heated to the first regeneration temperature is sent into the sorption device and exhaust air containing moisture and carbon dioxide released from the sorbent is discharged to the outside of the vehicle cabin.

2. The air purification device as defined in claim 1, wherein the sorbent releases one of the sorbed moisture and carbon dioxide at a second regeneration temperature higher than the purification temperature and lower than the first regeneration temperature,
wherein the air purification device further comprises:
an in-cabin CO2 concentration sensor that detects a carbon dioxide concentration in the vehicle cabin; and
an in-cabin absolute humidity estimator that estimates an absolute humidity in the vehicle cabin,
and wherein the controller is configured to control the three-way valve, the blower, and the heater based on outputs of the in-cabin CO2 concentration sensor and the in-cabin absolute humidity estimator to thereby selectively execute the purification mode, the first regeneration mode, and a second regeneration mode in which air heated to the second regeneration temperature is sent into the sorption device, and exhaust air containing the one of the moisture and carbon dioxide released from the sorbent is discharged to the outside of the vehicle cabin.

3. The air purification device as defined in claim 2, wherein the controller is configured to estimate a carbon dioxide sorption state of the sorption device based on the output of the in-cabin CO2 concentration sensor, to estimate a moisture sorption state of the sorption device based on the output of the in-cabin absolute humidity estimator, and to start execution of the first regeneration mode or the second regeneration mode when at least one of the estimated carbon dioxide sorption state and the estimated moisture sorption state has reached a predetermined threshold value.

4. The air purification device as defined in claim 3, wherein the sorbent releases the sorbed carbon dioxide at the second regeneration temperature,
the air purification device further comprises a fogging detector that detects glass fogging, and
the controller is configured to execute the first regeneration mode when the fogging detector detects glass fogging, and to execute the second regeneration mode when the fogging detector detects no glass fogging.

5. The air purification device as defined in claim 2, wherein the in-cabin absolute humidity estimator is configured to estimate the absolute humidity in the vehicle cabin based on a number of vehicle occupants and a ride time of the vehicle occupants.

6. The air purification device as defined in claim 2, wherein the in-cabin absolute humidity estimator is configured to estimate the absolute humidity in the vehicle cabin based on a state of operation of a wiper.

7. The air purification device as defined in claim 1, wherein the controller is configured such that during traveling of the vehicle, the controller selectively executes the purification mode or the first regeneration mode if an air conditioner is in an inside air recirculation mode in which air outside the vehicle cabin is not admitted into the vehicle cabin.

8. The air purification device as defined in claim 7, wherein the controller is configured such that when the vehicle is stopped, the controller starts execution of the first regeneration mode when power feeding to the vehicle from outside is started.

9. The air purification device as defined in claim 8, wherein the controller is configured to terminate the first regeneration mode which is being executed when a predetermined time has lapsed from a start of execution of the first regeneration mode.

10. The air purification device as defined in claim 8, further comprising a CO2 sensor provided in the outlet of the sorption device,
wherein the controller is configured to terminate the first regeneration mode which is being executed when an amount of released CO2 estimated from an output of the CO2 sensor has reached a predetermined value.

11. The air purification device as defined in claim 8, further comprising a temperature sensor and a humidity sensor provided in the outlet of the sorption device,
wherein the controller is configured to terminate the first regeneration mode which is being executed when an amount of released moisture estimated based on outputs of the temperature sensor and the humidity sensor has reached a predetermined value.

\* \* \* \* \*